Patented Sept. 10, 1929.

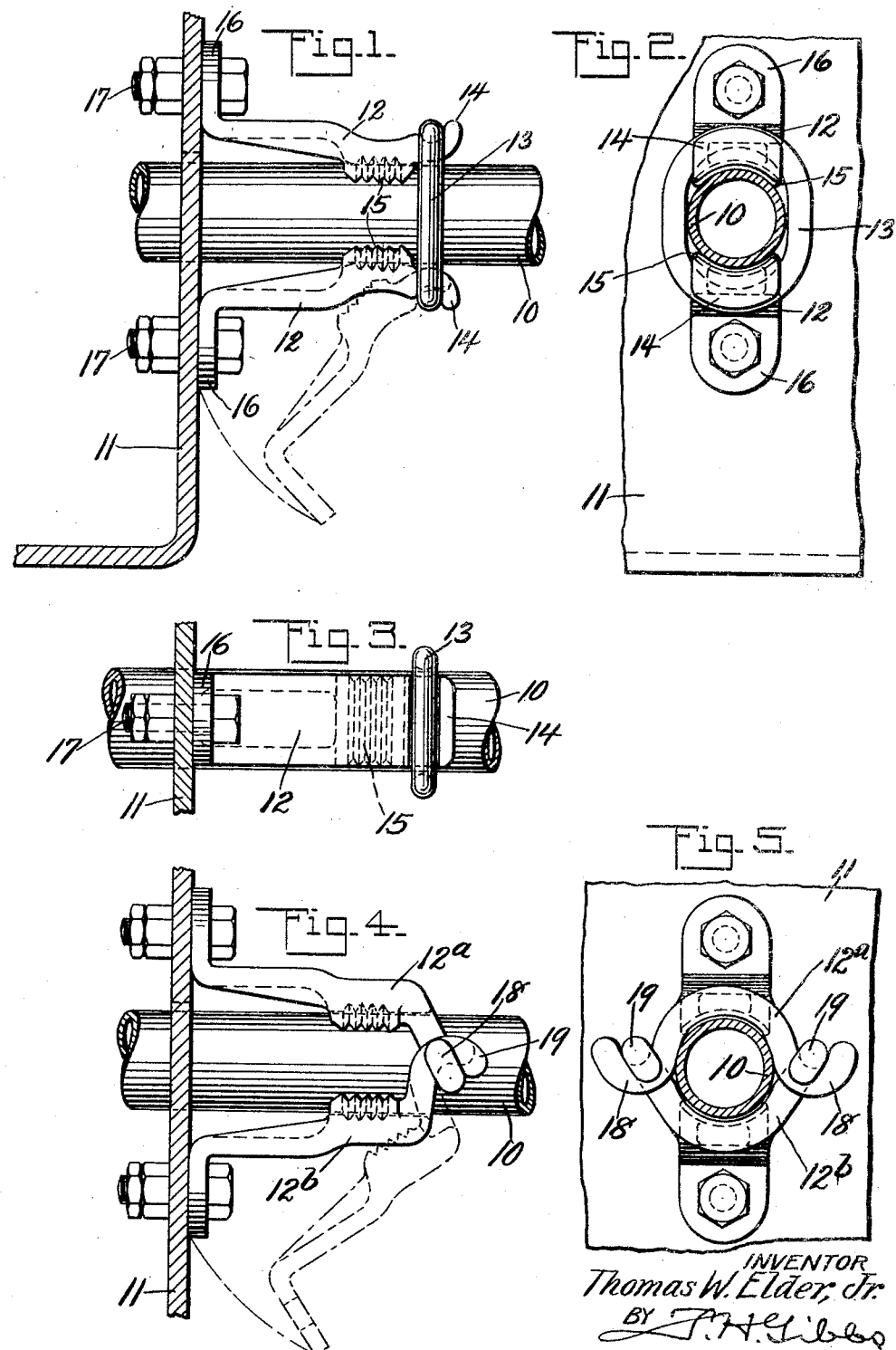

1,727,701

UNITED STATES PATENT OFFICE.

THOMAS W. ELDER, JR., OF BROOKLYN, NEW YORK, ASSIGNOR TO AMERICAN CAR AND FOUNDRY COMPANY, OF NEW YORK, N. Y., A CORPORATION OF NEW JERSEY.

PIPE CLAMP.

Application filed June 28, 1926. Serial No. 119,109.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 1 is a side view of a clamp conveniently embodying my invention, applied to securing a pipe to a car bolster web or the like, which is shown in section;

Fig. 2 is an end view of the clamp and pipe, from the right of Fig. 1;

Fig. 3 is a plan view of the parts shown in Figs. 1 and 2, with the web in section;

Fig. 4 is a view similar to Fig. 1, showing a somewhat different construction;

Fig. 5 is a view similar to Fig. 2, but showing the construction of Fig. 4.

My invention relates to pipe clamps and the like, my aim being to provide a simple, strong, convenient and effective device of this character. In suitable forms of embodiment, such as here shown and described, my invention is well adapted for securing pipes under railway cars to diaphragms or end sills of the car structure.

Figs. 1, 2, and 3 show a pipe 10 extending through the web of an end sill 11 or the like, with a clamp constructed in accordance with my invention applied to secure the pipe to the web. As shown in these figures, the clamp comprises a pair of rigid jaws 12, 12, linked and fulcrumed together by an elongated link 13. The ends of the jaws 12, 12 are bent or curved outward at 14, 14 to afford semi-circular transverse seats for the ends of the link 13. In the present instance, the jaws 12, 12 extend in the general longitudinal direction of the pipe 10, and have serrated concave longitudinal seats 15, 15 for engaging and gripping the pipe; and the inter-connecting link 13 embraces the pipe. The other ends of the jaws 12, 12 are held together in pipe-gripping relation, preferably by attachment to the diaphragm 11. For this purpose, the jaws 12, 12 are provided with outward-projecting feet 16, 16, apertured to take bolts 17, 17 which also extend through suitably located holes in the diaphragm 11. As shown in Figs. 1 and 2, the ends of the jaws 12, 12 that have the feet 16, 16 are of channel-like cross-section, so as to be as rigid as possible.

In applying the device, the ends of the jaws 12, 12 that have the feet 16, 16 may be forcibly brought together by means of a temporary clamp until the jaws firmly grip the pipe and the apertures in the feet 16, 16, come opposite the holes in the diaphragm 11,—whereupon the bolts 17, 17 may be slipped in and their nuts applied and tightened up, and the temporary clamp removed.

As a whole, it will be seen, the pair of jaws 12, 12 shown in Figs. 1 to 3 bear a general resemblance to a pair of nut-crackers, particularly in the interconenction of their ends 14, 14 and in the location of the pipe-engaging seats 15, 15 at an intermediate point in their length near the ends 14, 14.

The device shown in Figs. 4 and 5 differs from that of Figs. 1 to 3 in that the jaws 12$^a$, 12$^b$ are linked and fulcrumed together by direct inter-engagement at either side of the pipe 10. For this purpose, one jaw 12$^a$ has at its end a pair of hooks 18, 18 curved transversely with reference to the pipe 10, outward and upward, while the other jaw 12$^b$ has hooks 19, 19 curved lengthwise of the pipe 10 and downward. The interlinked hooked ends of the jaws 12, 12 embrace the pipe 10 very much as does the connecting link B in Figs. 1–3.

In either of the forms shown and described, the device is rugged, simple, easy and convenient to apply, and grips and secures the pipe 10 very effectively.

What is claimed is:

1. A clamp of the kind described comprising oppositely arranged gripping elements extending longitudinally of a pipe and fulcrumed together at one end, pipe gripping surfaces adjacent the fulcrumed end, and attaching flanges at the other end of the elements for securing the latter to a fixed support with the gripping surfaces in engagement with the pipe.

2. A clamp of the kind described comprising inflexible elements for attachment at one end to a fixed support and fulcrumed together at their free ends, pipe engaging seats intermediate the ends of said elements for gripping a pipe when said elements are moved toward each other, and means for securing the inflexible elements to a fixed support.

3. A clamp of the kind described comprising inflexible elements fulcrumed together at one end, securing feet at the other end for attaching said elements to a fixed support, pipe gripping surfaces formed on each of said elements intermediate the ends thereof for engaging a pipe extending between the elements when the latter are swung on the fulcrum to position the feet against the support.

In witness whereof I have hereunto set my hand.

THOMAS W. ELDER, Jr.